April 11, 1967 G. J. LANDAUER 3,313,979
DEVICE FOR PRODUCING ELECTRO-MAGNETIC OSCILLATIONS
OF VERY HIGH FREQUENCY
Filed June 29, 1962 2 Sheets-Sheet 1
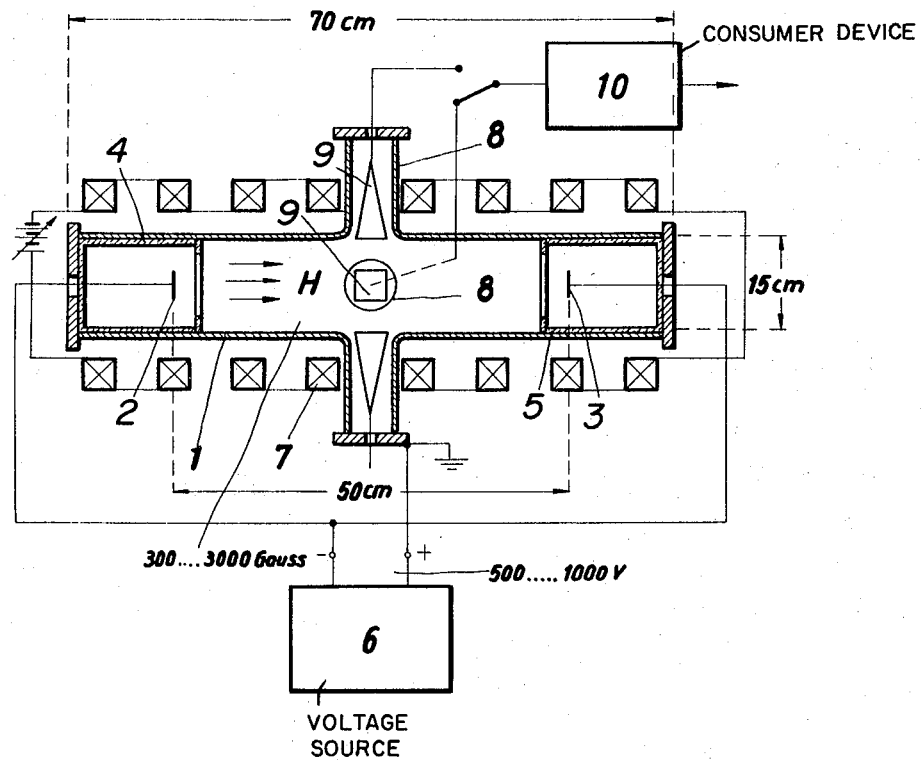
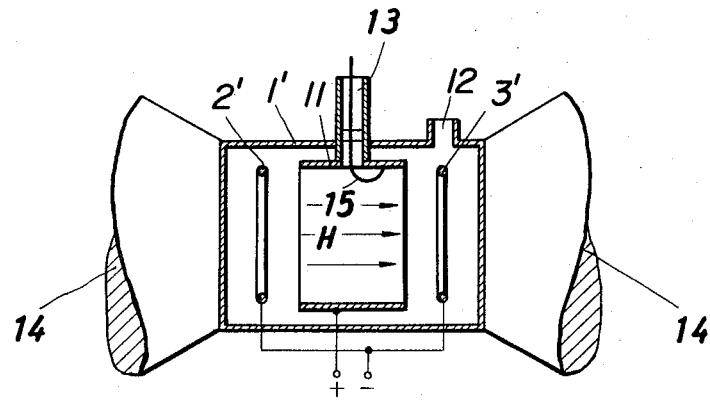
Inventor:
GERD J. LANDAUER
BY: George H. Spencer
ATTORNEY April 11, 1967 G. J. LANDAUER 3,313,979
DEVICE FOR PRODUCING ELECTRO-MAGNETIC OSCILLATIONS
OF VERY HIGH FREQUENCY
Filed June 29, 1962 2 Sheets-Sheet 2
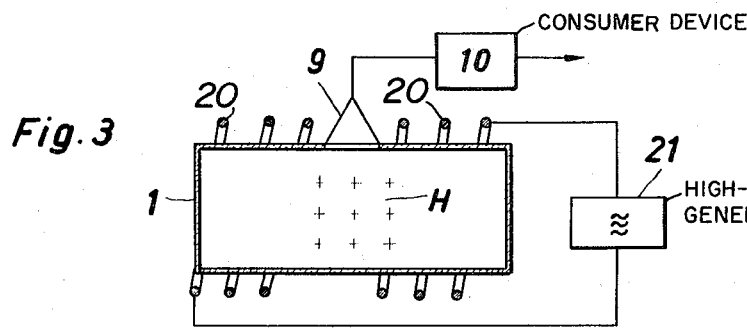
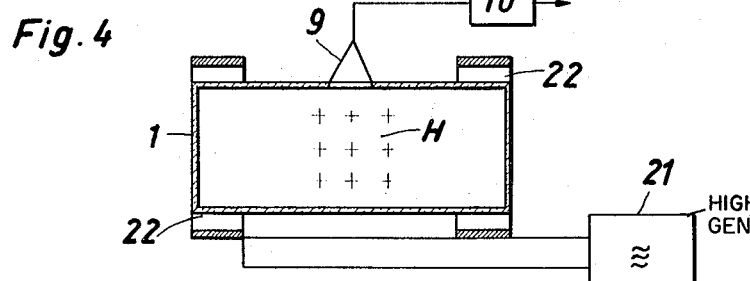
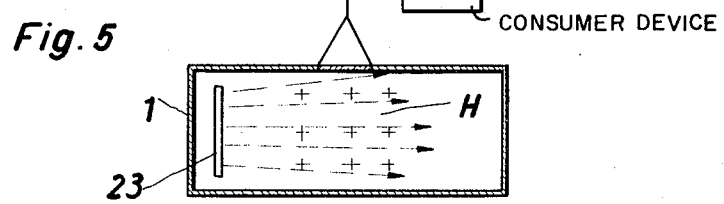
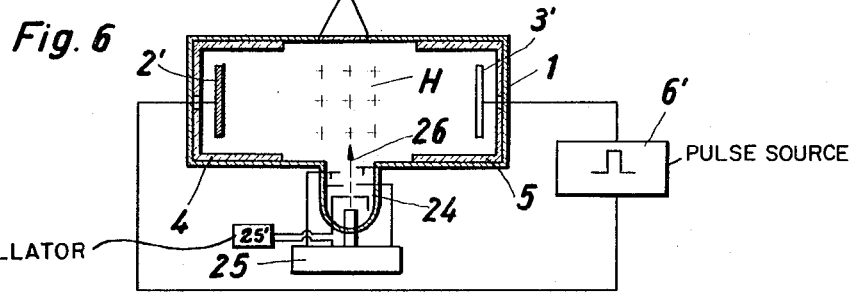
Inventor:
GERD J. LANDAUER
BY: *George U. Spencer*
ATTORNEY

United States Patent Office 3,313,979
Patented Apr. 11, 1967

3,313,979
DEVICE FOR PRODUCING ELECTRO-MAGNETIC OSCILLATIONS OF VERY HIGH FREQUENCY
Gerd J. Landauer, Unterhaching, Germany, assignor to Max-Planck-Gesellschaft zur Förderung der Wissenschaften e.V., Gottingen, Germany
Filed June 29, 1962, Ser. No. 206,466
Claims priority, application Germany, June 29, 1961, M 49,505; Sept. 15, 1961, M 50,310; Nov. 21, 1961, M 50,946
10 Claims. (Cl. 315—39)

The present invention relates to an arrangement for producing microwaves. The invention is particularly, but not exclusively, concerned with an arrangement for the production of microwaves in the transition region between millimeter waves and the long-wave infrared range.

It is the object of the invention to provide a high-frequency generator for very short waves, particularly in the practically inaccessible transition region between the millimeter-wave range and the range of long-wave infrared radiation, which generator, it is true, only supplies oscillations of comparatively small energy, but is very well suited, for instance, for measuring purposes due to its simple construction and its easy adjustment.

It has been found, contrary to all expectations, that harmonics of the electron-cyclotron frequency $f_e = eB/2\pi m$ ($e$=charge of an electron, $m$=mass of an electron, $B$=magnetic induction) can be derived with a useful amplitude from a cold low-pressure discharge plasma within which a magnetic field is active. Examples of suitable discharge plasmas are: Penning-discharges (see e.g. Physics IV, No. 2, February 1937, pages 71 to 75), the positive column of a direct-current low-pressure discharge, linear or circular high-frequency discharges without electrodes and plasmas produced by nuclear radiation (above all β-rays). This enumeration is by no means exhaustive.

The harmonics of the electron-cyclotron frequency $f_e$ have comparatively high energy in those cases where the index of refraction of the plasma, from which the micro-wave energy is derived, is so high that the wavelength of the electron-cyclotron frequency $f_e$ is of the order of magnitude of the circumference of the circular or spiral path along which the electrons move under the influence of the magnetic field. In other words, this condition means that the electron speed $v$ is at least approximately equal to $c/n$ ($n$=index of refraction of the plasma at the electron-cyclotron frequency $f_e$, and $c$=velocity of light) and that the wavelength $\lambda$ of the electron-cyclotron radiation equals $$\frac{c}{f_e \cdot n}$$

The terms of this relationship can be transposed in the following manner: $c/n = \lambda f_e$. Thus, if the electrons are given a velocity $v$ substantially equal to $c/n$, the same relationship will exist between this velocity, the wavelength $\lambda$ of the electron-cyclotron radiation in a medium having an index of refraction $n$, and the electron-cyclotron frequency $f_e$ as that which exists in free space between the velocity of light $c$, the wavelength $\lambda_0$ of a given radiation frequency, and the radiation frequency $f$. If this condition is fulfilled, then non-relativistic conditions are established for the circulating electrons and a strong multipolar radiation occurs which correspond to the harmonics of the electron-cyclotron frequency $f_e$.

An arrangement is also within the scope of the invention wherein additional electrons are injected into a cold low-pressure palsma with generally comparatively low electron temperature (for instance one of the above enumerated palsmas) in which a magnetic field is set up. The velocity $v'$ of these additional electrons is preferably so chosen, that $v'$ is a least approximately equal to $c/n$. Generally this condition can be easily fulfilled.

The index $n$ of refraction of the palsma can generally be increased by increasing the palsma frequency $$\omega p = \sqrt{4\pi e^2 N/m}$$

($N$= the number of electrons per unit volume) and reducing the collision frequency between electrons and neutral particles and ions.

The plasma radiates in an anisotropic manner as a rule. The energy can therefore best be withdrawn at the point of a radiation maximum, preferably, but not necessarily, at right angles to the magnetic field.

The magnetic field, which is required for the arrangement according to the invention, may be produced by an arrangement of electromagnets and/or permanent magnets; the selection depends on the extent of the desired tuning ability (adjustable frequency range of the output energy). For the tuning between the 10th and 11th harmonics for instance, a 10% variation of the magnetic induction B will be sufficient. Therefore, a constant field can be set up by means of a permanent magnet, on which field a comparatively weak additional field produced by means of an electromagnet is superimposed for a frequency regulation of for instance ±5%.

The invention will now be described in more detail with reference to constructional examples represented in the drawings. However, the constructional details and the stated dimensions and operating data should not be interpreted in a limiting sense.

FIGURE 1 represents diagrammatically and partially by way of a block diagram a first embodiment of the invention wherein the plasma is produced by a discharge of the Penning type;

FIGURE 2 shows diagrammatically a discharge device and parts of a magnet arrangement of a second embodiment of the invention, likewise operating with a Penning-discharge;

FIGURES 3 and 4 represent diagrammatically embodiments of the invention wherein the plasma is produced by so-called high-frequency discharges without electrodes;

FIGURE 5 represents an embodiment of the invention wherein the discharge plasma is produced by a radio-active substance; and FIGURE 6 represents an embodiment of the invention wherein the plasma is produced by a direct-current discharge. This embodiment also comprises an arrangement for the injection of additional electrons.

For the sake of clarity, the embodiments are represented in the drawings in a simplified manner. Similar parts are designated by the same reference numerals.

The arrangement shown in FIGURE 1 comprises a vacuum-tight envelope 1 which is made of alloy steel (or of another non-magnetic material) and which contains in operation a gas under reduced pressure. The filling may comprise one or more rare gases, preferably helium, or other ionisable gases, such as hydrogen. In the represented arrangement a pressure has been used between $10^{-2}$ and 1 torr (mm. Hg). The intensity of radiation generally decreases with decreasing pressure. Therefore low pressures are preferable; however the stability of the discharge must be ensured.

The envelope 1 may be connected through a pipe-line, not shown, with a vacuum installation which permits the evacuation of the envelope and the subsequent filling of the envelope with a desired gas under a desired pressure. On the other hand, the envelope 1 may be once filled and then sealed by fusion.

Two electrodes 2, 3 are arranged near the ends of the substantially cylindrical envelope 1, which electrodes are insulated by means of inserts 4, 5 of ceramic material. The electrodes are connected to the negative pole of a voltage source 6 through supply leads passing, in an insulated manner, through the wall of the envelope, the positive pole of the voltage source being connected to the grounded wall of the envelope 1. The voltage source 6 is suited to supply a voltage high enough to initiate the discharge and a current sufficient for maintaining the discharge.

Magnet coils 7 produce in the envelope 1 a unidirectional magnetic field which is parallel to the axis of the envelope and whose intensity can be adjusted.

The envelope 1 has projecting arms 8 which extend substantially at right angles to one another and which accommodate horn antennas 9 for withdrawing the electromagnetic output energy, which antennas are connected to vacuum-tight hollow conductors which lead to a consumer device 10.

In order to start the operation of the device, a gas discharge is initiated between the cathodes 2 and 3 and the wall of the casing, for instance by means of a voltage pulse, and thereafter the discharge is maintained by a continuous voltage of about 200 to 300 v. with a current of about 0.5 to 1 a. These values depend to a certain degree on the dimensions of the apparatus, on the kind of gas used, on the gas pressure, and so on, and they are stated here only by way of example.

In the case of a Penning-discharge, the space between the cathodes 2, 3 is filled with a cold plasma, which has practically no associated field, as is well known. The density of electrons is of an order of magnitude between $10^{12}$ to $10^{14}$ cm.$^{-3}$, the electrode temperature is about 1 e.v. Nevertheless, electrons having higher energy may be contained in the plasma which electrons surrender their excess energy for instance by collision with other particles or also by energizing an emission of electro-magnetic radiation. In order to maintain the discharge under the described conditons, an energy in the order of magnitude of 100 w. is sufficient.

When the discharge has been initiated and the magnetic field parallel to the axis has been set up, high-frequency oscillations can be withdrawn from the discharge space, the basic frequency of these oscillations conciding with the electron-cyclotron frequency $f_e = eB/2\pi m$ ($B$=magnetic induction, $e$=charge, and $m$=mass of the electrons). Thus, the frequency can be conveniently varied by a variation of the magnetic induction B.

Contrary to expectations, the harmonics of the basic frequency have a comparatively high energy in the discharge of the described type. It was possible to withdraw at the output harmonics of up to $n > 20$ with useful energy. It is even possible that the intensity first increases with increasing $n$, then reaches a maximum and thereafter decreases again. If the output coupling is tuned to a desired harmonic, then it is easily possible to obtain very short waves in the range from the sub-millimeter region to the long-wave infra-red region. Apart from a coarse tuning by selecting a certain harmonic, it is possible to vary the wave length continuously in a simple manner by adjusting the magnetic field.

As one example of the conditions under which the device of FIGURE 1 can be caused to operate according to the present invention, let it be assumed that the voltage source 6 produces a voltage of 1000 volts and that the magnetic field B has a value of 1000 gauss. It is known that the circular path followed by an electron accelerated by a voltage V in a magnetic field having a value B (gauss) has a radius $r$ equal to $$3.37 \frac{\sqrt{V}}{B}$$

In the present case, this radius will be equal to:

$$\frac{3.37\sqrt{10}}{100} = 0.1 \text{ cm.}$$

In addition, the equation:

$$f_e = \frac{eB}{2\pi m_e}$$

can be employed to establish that when the magnetic field B has a value of 1000 gauss, the electron-cyclotron frequency $f_e$ will be equal to 2800 megacycles per second. This frequency corresponds to a free-space radiation wavelength, $\lambda_0$, of 10.7 cm.

It is desired, in order to achieve the novel results of the present invention, that the wavelength $\lambda$ of the electron-cyclotron frequency radiation in the plasma created in envelope 1 be approximately equal to the circumference ($2\pi r$) of the circular path described by the electrons under the influence of the magnetic field. This can be expressed as: $\lambda \approx 2\pi r$. Since $\lambda$ also equals $\lambda_0/n$, it can be seen that $n = \lambda_0/2\pi r$. Substituting the values of 10.7 cm. for $\lambda_0$ and 0.1 cm. for the radius $r$ in the last equation yields a value of $n \approx 17$.

Thus, it is necessary to provide a plasma having an index of refraction of the order of 17 to create the conditions required for obtaining the results according to the present invention.

FIGURE 2 represents another embodiment of the invention which operates on the same basic principle. Two rings 2', 3' serve as cathodes and a cylindrical body 11 as anode. The envelope 1' consists of glass and is connected to a vacuum installation through a pipe 12 so that it is possible to maintain in the envelope 1' the desired gas filling at the desired pressure. The output coupling of the high-frequency oscillations is effected by a coaxial conductor 13 which is introduced in a vacuum tight manner and is connected to the anode cylinder 11 by means of a coupling loop 15. Only the pole pieces of the magnet 14 are shown, which pole pieces abut against the end faces of the substantially cylindrical envelope 1'. As in the case of FIGURE 1, an electromagnet may be provided, which can be replaced, of course, if desired by a permanent magnet or by a combination of both types of magnets.

In the construction shown in FIGURE 3, a vacuum envelope 1 with an output coupling 9 is used which substantially corresponds to the construction shown in FIGURE 1. In this embodiment, however, the plasma is produced by two series-connected high-frequency coils 20 which are connected to a high-frequency generator 21. The frequency of the generator may be for instance $30 \times 10^6$ cycles per second; however the frequency is not critical. The output of the generator 21 must be sufficient to produce within the discharge envelope 1 a discharge without electrodes, however the output should not be selected so high that the gas temperature is raised during operation appreciably above room temperature. The vacuum envelope 1 consists in this case preferably of glass or quartz. The magnetic field passes through the arrangement shown in FIGURE 3 at right angles to the plane of the drawing and is indicated by crosses.

The arrangement shown in FIGURE 4 corresponds substantially to that shown in FIGURE 3 with the exception that, instead of inductively acting coils, capacitively acting electrodes 22 are connected to the high-frequency generator 21 which electrodes set up a so-called "linear" discharge without electrodes.

In the arrangement shown in FIGURE 5, the discharge plasma is produced by a radioactive substance 23, preferably a substance emitting β-rays.

The embodiment shown in FIGURE 6 contains two electrodes 2', 3' which are introduced into the envelope 1 in a vacuum-tight manner and which are connected to a direct-current source 6'. The operating voltage and the dimensions are so selected that a positive column of a direct-current low-pressure gas discharge is set up in the region of the magnetic field H. In this constructional example, additional electrons are injected into the region of the magnetic field H. For this purpose, a radiation generating system 24 of conventional construction may be used which preferably supplies an electron beam in the form of a sheet in a plane which is at right-angle to the magnetic field and lies in the plane of the output coupling 9. A window with pressure steps (that is to say a device having a number of diaphragms arranged one after the other and the spaces between them connected to pumps so that a high-vacuum may be maintained within the radiation-producing system, whilst within the discharge envelope 1 that pressure exists which is most favourable for the discharge) is arranged between the radiation-producing system and the discharge space in the envelope. The radiation-producing system 24 is connected in a manner known per se to an operational voltage source 25.

Since the nature of a plasma can be influenced to a certain degree by the manner of its ignition, the current supply member 6' (or 6, FIGURE 1) is preferably so designed that selectively at least one direct voltage pulse, if desired of adjustable duration and steepness of its flanks, or a periodic voltage, if desired of adjustable frequency, is available for the ignition of the discharge.

The output frequency may be modulated by causing the magnetic field to vary in synchronism with the modulating signal.

The intensity of the harmonics can be increased and the output radiation of the harmonics can be made more coherent by modulating the density of the electron beam injected into the plasma in synchronism with the electron-cyclotron frequency $f_e$. The density modulation of the electron beam may be effected by a velocity modulation like that which takes place in a klystron oscillator, the locus of maximum density variations being placed in the receiving region of the output coupling device.

If possible, having regard to the frequency range, the density modulation may be effected directly by an alternating-voltage of electron-cyclotron frequency at an electrode in the form of a diaphragm or wire grid of a system consisting preferably of plane electrodes. One such arrangement is shown in FIGURE 6 to consist of an oscillator 25' connected to modulate the voltage on a control electrode of the system 24.

At comparatively high frequencies, the electron beam will be modulated in its velocity within the beam-producing system 24 like in a klystron oscillator. The beam-producing system 24 will be provided in this case with a cavity resonator such as used as input cavity of a two-stage klystron oscillator. For the feed of this cavity, with the modulated high-frequency voltage, the unit 25 may contain any suitable device, for instance a klystron oscillator, a magnetron or the like.

As a result of the density modulation of the electron beam, a synchronism, at least to a certain extent, of the electrons circulating within the plasma is obtained and with it a phase coherence of the electro-magnetic waves produced by the circulating electrons. The phase coherence is obtained both for the basic wave as well as for the harmonics.

An additional advantage of the density modulation of the electron beam consists in that the high-frequency energy (e.g. 1 w. and more) supplied to the electron beam by the density modulation also increases the power of the harmonics so that their power may be several powers of ten larger than in a case without modulation.

In addition to the density modulation, the velocity of the electrons within the plasma may be varied periodically so that the critical range, that is to say the electron velocity $v'=c/n$, can be passed periodically. The last mentioned manner of modulation may also serve for an amplitude modulation of the high-frequency oscillation withdrawn by the output coupling.

The beam-producing system 26 is preferably designed to produce a substantially conically widening beam between the electrodes 2' and 3'. It is also possible to inject the electron beam parallel wiht the magnetic field H.

What I claim is:

1. An arrangement for producing electro-magnetic waves having a wavelength in the millimeter range and below, comprising, in combination:
   a hollow body;
   a gas capable of being ionized disposed in said body under reduced pressure;
   means for producing a magnetic field in a certain region within said body;
   means for producing in said region, a low temperature plasma including free electrons, the plasma having an index of refraction at least within certain portions of said region which is so high that the wavelength of the electron-cyclotron radiation, which wavelength is inversely proportional to said index of refraction, is at least of the order of magnitude of the circumference of the arcuate paths along which at least some of the electrons move under the action of the magnetic field; and
   means for coupling out high frequency energy at a frequency which is a harmonic of the electron-cyclotron frequency.

2. An arrangement as defined in claim 1 wherein said magnetic field means is variable to allow for fine adjustment of the frequency.

3. An arrangement as defined in claim 2 wherein said magnetic field means includes an electro-magnetic and an adjustable current source supplying said electromagnet.

4. An arrangement as defined in claim 1 wherein the body is vacuum tight, said plasma producing means including two spaced coaxial electrodes, a third electrode element, means for negatively biasing said two coaxial electrodes with respect to said third electrode element for providing a Penning-discharge.

5. An arrangement as defined in claim 4 wherein said third electrode element is the wall of said body.

6. An arrangement as defined in claim 1 comprising means for injecting a modulated electron beam into the plasma.

7. An arrangement as defined in claim 6 wherein said beam injecting means is arranged for energy modulation of the electron beam.

8. An arrangement as defined in claim 7 wherein said beam injecting means is arranged so that the distance between the locus of the energy modulation and the plasma is such that maximum density variations are obtained in that region of the plasma in which said coupling means is effective.

9. An arrangement as defined in claim 6 wherein said beam injecting means is arranged so that the modulation frequency coincides at least approximately with the electron-cyclotron frequency.

10. An arrangement as defined in claim 1 wherein said coupling means are arranged to couple out of the plasma a harmonic which is greater than the fifth.

(References on following page)

References Cited by the Examiner

UNITED STATES PATENTS

| | | | |
|---|---|---|---|
| 2,624,867 | 1/1953 | Cobine et al. | 331—78 X |
| 2,817,045 | 12/1957 | Goldstein et al. | 315—39 |
| 2,837,693 | 6/1958 | Norton | 315—39 |
| 2,848,649 | 8/1958 | Bryant | 315—39 |
| 2,965,795 | 12/1960 | Norton | 315—5.35 |
| 3,099,768 | 7/1963 | Anderson | 315—39 X |
| 3,111,604 | 11/1963 | Agdur | 315—39 |
| 3,171,053 | 2/1965 | Targ et al. | 315—39 X |

OTHER REFERENCES

Plasma Physics, by Linhart, 1961, QC 711 L-5, pp. 43 to 46 relied upon.

Plasma Physics, by Linhart, 1961, QC 711 L-5 pp. 46-52.

HERMAN KARL SAALBACH, *Primary Examiner*.

ARTHUR GAUSS, ELI LIBERMAN, *Examiners*.

S. CHATMON, JR., *Assistant Examiner*.